No. 635,361.   Patented Oct. 24, 1899.
R. TITUS.
NUT LOCK.
(Application filed Feb. 25, 1899.)
(No Model.)
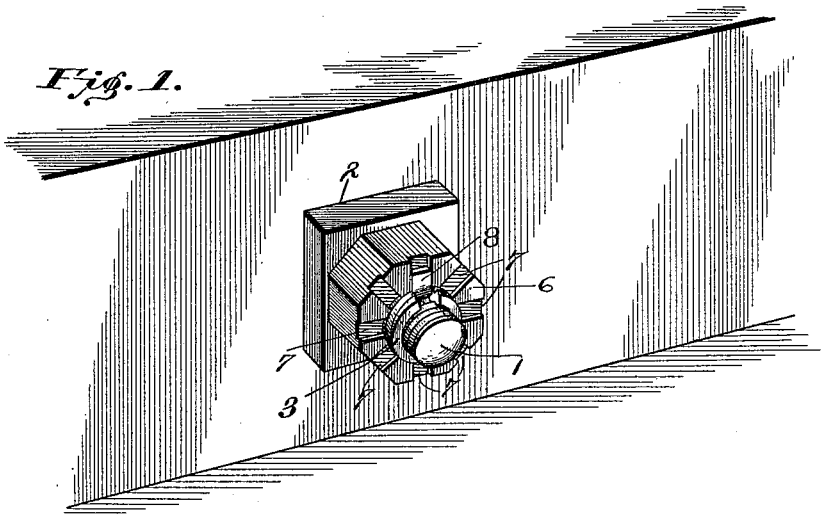
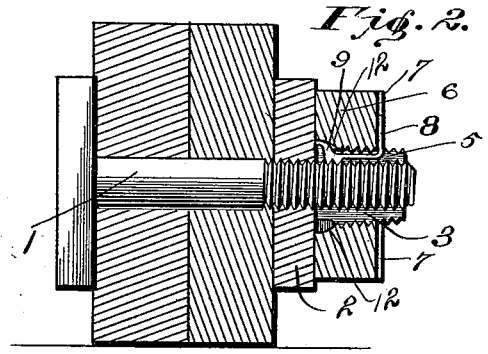
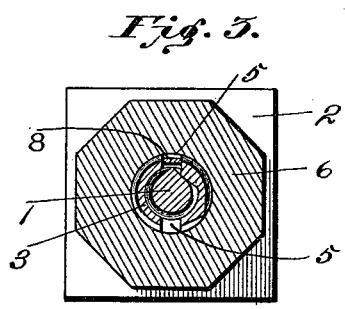
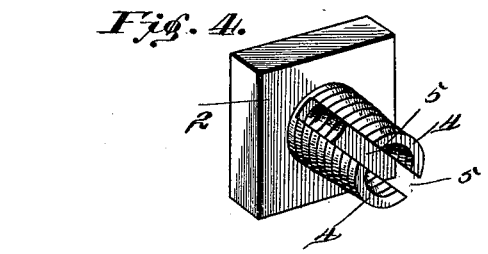
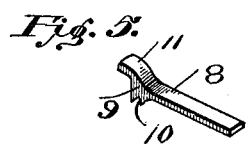
Witnesses  Richard Titus, Inventor.

UNITED STATES PATENT OFFICE.

RICHARD TITUS, OF BOWLING GREEN, OHIO.

NUT-LOCK.

SPECIFICATION forming part of Letters Patent No. 635,361, dated October 24, 1899.

Application filed February 25, 1899. Serial No. 706,859. (No model.)

*To all whom it may concern:*

Be it known that I, RICHARD TITUS, a citizen of the United States, residing at Bowling Green, in the county of Wood and State of Ohio, have invented a new and useful Nut-Lock, of which the following is a specification.

This invention relates to nut-locks; and the object thereof is to provide an improved construction whereby a nut may be locked upon a bolt against accidental displacement therefrom and also permit of the nut being removed, as desired.

To these ends the present invention consists in the combination and arrangement of parts, as will be hereinafter more fully described, shown in the accompanying drawings, and particularly pointed out in the appended claims.

In the drawings, Figure 1 is a perspective view of the improvements in locked position. Fig. 2 is a longitudinal sectional view thereof. Fig. 3 is a transverse sectional view taken through the key. Fig. 4 is a detail perspective view of the nut. Fig. 5 is a detail perspective view of the key.

Like numerals of reference denote like and corresponding parts in each of the several figures of the drawings.

Referring to the accompanying drawings, 1 designates an ordinary threaded bolt, and 2 the nut thereon. This nut is provided with a tubular extension 3, tapered outwardly upon its outer side and threaded both internally and externally. The threaded interior of the extension forms a continuation of the bore of the nut, and the extension is split longitudinally, forming opposite spring-jaws 4, which are separated by the slots 5. This nut is fitted upon the bolt, as usual, the extension projecting outward therefrom. A clamping cap or nut 6, having a tapered threaded bore to correspond with the taper of the extension 3 of the nut 2, is screwed thereon until the jaws 4 are clamped tightly upon the threads of the bolt, which locks the nut 2 against accidental turning. The outer face of the clamping-nut is provided with a plurality of radial grooves 7, intersecting the bore thereof.

To lock the clamping-nut against turning, a key 8 is provided, which is illustrated in Fig. 5 of the drawings. This key has a flat shank, which is provided with an integral enlarged head 9 at one end thereof. The head is provided with teeth or threads 10 upon one side thereof and an offset lug 11 upon the end of the head opposite the teeth thereof. When the nut 2 has been set to its proper place and before the clamping-nut 6 has been applied, the key 8 is placed in one of the slots 5 between the jaws of the nut 2. The head end of the key is arranged against the outer face of the nut, with its teeth or threads 10 engaging with the threads of the bolt. It will be noted that the head of the key projects up out of the slot 5 and is beveled or rounded outward toward its end. The inner end of the bore of the clamping-nut is smooth or unthreaded, as at 12, and the inner end of this smooth bore is rounded or beveled inward to the threaded bore, as shown. The key having been placed in position, as described, the clamping-nut is screwed upon the extension 3 of the nut 2, and the enlarged smooth bore 12 engages with the rounded or beveled portion of the head of the key 8, and thereby forces the teeth 10 into positive engagement with the threads of the bolt. After the clamping-nut has been set in place the projecting end of the key is bent back into one of the grooves 7, formed across the outer face of the clamping-nut.

When the parts have been assembled, as described, it will be observed that the clamping-nut clamps the jaws or extension of the nut 2 tightly against the threads of the bolt, which prevents the nut from being accidentally turned, the teeth of the key are positively engaged with the threads of the bolt, whereby longitudinal displacement of the key is prevented, and the outer end of the key is bent into one of the grooves in the face of the clamping-nut, whereby the latter is prevented from being accidentally unscrewed as the key is seated within one of the slots 5, and the walls thereof will hold the key fixed to the extension of the nut 2. By inserting a pointed implement under the bent extremity of the key the same may be straightened out, and the clamping-nut is then free to be unscrewed, which releases the nut 2.

By the combination and arrangement of the parts as herein set forth an effective and improved form of nut-lock is provided which may be readily applied and as readily released, permitting of the repeated use of the same device.

Changes in the form, proportion, size, and minor details of construction within the scope of the appended claims may be resorted to without departing from the spirit or sacrificing any of the advantages of this invention.

Having thus described the invention, what I claim is—

1. In a nut-lock, the combination with a bolt and a nut having a hollow extension which is internally and externally threaded and split longitudinally, of a clamping-nut for the extension, and a key adapted to be inclosed by the clamping-nut and having an interlocking engagement with the bolt and with the clamping-nut, substantially as shown and described.

2. In a nut-lock, the combination with a bolt, of a nut having a hollow conical extension split longitudinally forming opposite clamping-jaws, the latter being externally and internally threaded, a clamping-nut adapted to be fitted upon the conical extension and clamp the jaws thereof upon the bolt, and means whereby the clamping-nut may be locked against being accidentally turned upon the extension, substantially as shown and described.

3. In a nut-lock, the combination with a bolt, of a nut having a hollow conical extension split longitudinally forming opposite clamping-jaws, the latter being externally and internally threaded, a clamping-nut adapted to be fitted upon the conical extension and clamp the jaws thereof upon the bolt, and locking means engaging the bolt and the clamping-nut, whereby the latter is prevented from being accidentally turned, substantially as shown and described.

4. In a nut-lock, the combination with a bolt, of a nut having a hollow conical extension split longitudinally forming opposite clamping-jaws, the latter being externally and internally threaded, a clamping-nut adapted to be fitted upon the conical extension and clamp the jaws thereof upon the bolt, and a locking-key adapted to be fitted between respective edges of the jaws of the extension and provided with an engagement with the clamping-nut, whereby the latter is prevented from being accidentally turned upon the extension, substantially as shown and described.

5. In a nut-lock, the combination with a bolt, of a nut having a hollow conical extension split longitudinally forming opposite clamping-jaws, the latter being externally and internally threaded, a clamping-nut having radial grooves provided upon its outer face and intersecting the bore thereof, said clamping-nut being adapted to be fitted upon the extension and clamp the jaws upon the bolt, and a locking-key adapted to be fitted between respective opposite edges of the jaws, and have its outer end bent into one of the grooves of the clamping-nut, whereby the latter may be prevented from being accidentally turned, substantially as shown and described.

6. In a nut-lock, the combination with a bolt, of a nut having a hollow conical extension split longitudinally forming opposite clamping-jaws, the latter being externally and internally threaded, a locking-key having teeth or threads upon one of its faces and adapted to be fitted between respective opposite edges of the clamping-jaws, the teeth being in engagement with the threads of the bolt, and a clamping-nut adapted to be fitted upon the clamping-jaws and bind the same and the teeth of the key upon the threads of the bolt, to lock the nut and prevent longitudinal displacement of the key, the latter having an engagement with the clamping-nut, whereby the latter is prevented from being accidentally turned, substantially as shown and described.

7. In a nut-lock, the combination with a bolt, of a nut having a hollow conical extension split longitudinally forming opposite clamping-jaws, the latter being externally and internally threaded, a locking-key having teeth or threads upon one face, and a beveled or rounded portion on its opposite face, the key being adapted to be fitted between respective opposite edges of the spring-jaws, having its teeth engaging the threads of the bolt and its beveled or rounded portion projecting beyond the spring-jaws, and a clamping-nut adapted to be fitted upon the spring-jaws to clamp the same upon the bolt, and bind upon the rounded or beveled portion of the key and force the teeth thereof into the threads of the bolt, the key having an engagement with the clamping-nut, whereby the latter is prevented from being accidentally loosened, substantially as shown and described.

8. In a nut-lock, the combination with a bolt, of a nut having a hollow conical extension split longitudinally forming opposite spring-jaws, the latter being externally and internally threaded, a locking-key having teeth or threads upon one face, and a rounded or beveled offset lug provided upon the opposite face thereof, the key being adapted to be fitted between respective opposite edges of the spring-jaws with its teeth in engagement with the threads of the bolt and its lug projecting beyond the exterior of the jaws and engaging against the face of the nut, and a clamping-nut having the inner end of its bore enlarged and smooth or unthreaded and adapted to be fitted upon the spring-jaws, the unthreaded portion of the bore engaging the rounded or beveled lug of the key, and the latter having an engagement with the clamping-nut, whereby the latter is prevented from being loosened, substantially as and for the purpose set forth.

In testimony that I claim the foregoing as my own I have hereto affixed my signature in the presence of two witnesses.

RICHARD TITUS.

Witnesses:
AUSTIN R. HARRISON,
ALTA DE RIAR.